United States Patent
Coffee

[19]

[11] Patent Number: 6,138,744
[45] Date of Patent: Oct. 31, 2000

[54] CLOSED LOOP GEOTHERMAL HEAT EXCHANGER

[76] Inventor: Derek A. Coffee, 32725 Coffee School Rd., Salem, Columbiana County, Ohio 44460

[21] Appl. No.: 09/326,456

[22] Filed: Jun. 7, 1999

[51] Int. Cl.[7] .................................................. F28D 3/00
[52] U.S. Cl. ............................. 165/45; 165/48.1; 62/260
[58] Field of Search .............................. 165/45, 47, 48.1, 165/50; 62/260

[56] References Cited

U.S. PATENT DOCUMENTS

| | | |
|---|---|---|
| 2,461,449 | 2/1949 | Smith et al. . |
| 3,965,972 | 6/1976 | Peterson . |
| 4,008,709 | 2/1977 | Jardine ........................................ 165/45 |
| 4,237,859 | 12/1980 | Goettl . |
| 4,325,357 | 4/1982 | Wormser ..................................... 165/45 |
| 4,375,831 | 3/1983 | Downing, Jr. . |
| 4,448,237 | 5/1984 | Riley . |
| 4,489,568 | 12/1984 | Shapess ...................................... 62/260 |
| 4,509,503 | 4/1985 | Young ........................................ 165/47 |
| 4,607,169 | 8/1986 | Donnelly, Jr. ............................ 165/48.1 |
| 4,633,676 | 1/1987 | Dittell . |
| 4,936,110 | 6/1990 | Kückens . |

Primary Examiner—Ira S. Lazarus
Assistant Examiner—Terrell McKinnon
Attorney, Agent, or Firm—Frederic E. Naragon

[57] ABSTRACT

A closed loop geothermal heat exchanger in a heating and cooling system for conditioning the air in an enclosed structure comprising heat exchange coils disposed in the interior of an inground sealed tank external to the structure wherein inlet and outlet conduit provide for the inward and outward flow of water from an external source into and out of the tank and wherein the water within the tank is the geothermal heat exchange medium and further provides a domestic water supply for the structure and capped incoming and outgoing test conduits provide for water temperature and flow measurement and a removable sealed lid is provided on the tank top to access the tank for repairs and a support conduit is provided within the tank to eliminate residue build up within the tank top and enhance the mix of incoming and outgoing water temperature and an air gap is provided within the tank between the inlet conduit and the outlet conduit to eliminate back flow to the water source.

8 Claims, 4 Drawing Sheets

CLOSED LOOP GEOTHERMAL HEAT EXCHANGER

BACKGROUND OF THE INVENTION AND SUMMARY OF THE INVENTION

The present invention relates generally to a Closed Loop Geothermal Heat Exchanger for use primarily in a heating and cooling system for conditioning the air in enclosed structures such as homes, offices, manufacturing facilities, and related structures. The invention comprises generally a sealed tank which may be construed of any material meeting A.S.M.E. standards such as concrete, steel, plastic, fiberglass, or related composites and which is disposed underground and external to the enclosed structure wherein heat exchange coils are disposed in the interior of the tank and fluid within the tank, primarily water from the overflow of a well or other water source, exchanges heat with fluid circulated through the coils. The fluid circulating through the coils is connected to a heating and cooling apparatus in the enclosed structure by conduit forming a closed loop system. The heating/cooling apparatus in the enclosed structure, such as a heat pump, is not unique and is known in the art and conditions the air in the structure. The water within the tank is used as a geothermal heat exchange medium for heating and cooling of the enclosed structure and also as a domestic water supply source for the structure particularly where the water is supplied from an artisan well. In addition, the present invention provides a removable sealed lid on the top of the tank to allow access from the Earth's surface for servicing and repair of the tank and internal components. Capped test conduits are provided for measuring the temperature and flow of incoming and outgoing water in the tank. The invention further provides a water medium source from what would be normally overflow, waste, or surplus flow of water, and results in superheated waste water or in the case of free flowing artesian or spring water a temperature is maintained of approximately 52 degrees Fahrenheit medium water temperature for exchange with the heating/cooling apparatus disposed in the enclosed structure. Most closed loop systems in the prior art allow the medium temperature to drop well below 32 degrees Fahrenheit and require the use of an expensive nontoxic type antifreeze in the closed loop heating/cooling system in case cross contamination should occur. The present invention provides regulated flow and maintains an above freezing temperature and water may be used in the closed loop system as a medium. Further, and in the event of an artesian water supply to the tank, safe usage of the water for domestic purposes can be maintained even if cross mixing occurs because of the nonuse of any antifreeze solution in the closed loop system as a medium. In addition, the present invention provides an air gap separation within the tank between an inlet conduit supplying water to the tank and an outlet conduit supplying water from the tank to the enclosed structure in compliance with state building code regulations to alleviate and prevent back flow problems to the water source. Further, a self cleaning support conduit is provided within the confines of the tank to eliminate sediment build up and further provides for the mix of incoming and outgoing water temperature. An additional advantage of the present invention is the elimination of the use of energy consuming multifunctional horsepower pumps to circulate the fluid in the closed loop heating/cooling system and the elimination of vertical drilled bore holes often used in geothermal applications of the prior art, which require grout type sealers and which generally and eventually leak and allow for contamination of subterranean aqufiers from the surface water entering the bore holes.

Heretofore the prior art has disclosed patents for geothermal heat systems as an integral part in the heating/cooling of structures such as homes and buildings. Some of the patents of the prior art are listed as follows:

U.S. Pat. No. 2,461,449 M. M. Smith, et al, Feb. 8, 1949
U.S. Pat. No. 3,965,972 Peterson, Jun. 29, 1976
U.S. Pat. No. 4,237,859 Goettl, Dec. 9, 1980
U.S. Pat. No. 4,375,831 Downing, Jr. Mar. 8, 1983
U.S. Pat. No. 4,448,237 Riley, May 15, 1884
U.S. Pat. No. 4,633,676 Dittell, Jan. 6, 1987
U.S. Pat. No. 4,936,110, Kuckens, Jun. 26, 1990

U.S. Pat. No. 2,461,449 issued to Marvin M. Smith, et al, on Feb. 8, 1949, pertains to a heat pump using a deep well or heat source and employs an open water circuit supplying and returning water through a heat pump to a well bore. The invention does not provide or teach of an underground tank with heat exchange coils, closed loop heating/cooling system, incoming and outgoing water temperature flow test conduits, air gap separation to prevent backflow, self cleaning support conduit, or tank water used both as a geothermal heat exchange medium for heating/cooling of an enclosed structure and as a domestic water supply for the structure as is provided in the present invention.

U.S. Pat. No. 3,965,972 issued to Ross K. Peterson, on Jun. 29, 1976, pertains to and teaches of a heating/cooling system comprising a solar collector, cold storage ground well, and a heat exchange apparatus, wherein water from the cold storage ground well is heated in the heating exchange apparatus by a solar collector, and the heated water is stored in a heated storage ground well. The ground wells provide a source for heating and cooling of a structure and water sources for household purposes such as drinking and bathing. The invention does not provide or teach of an underground tank with heat exchange coils, closed loop heating/cooling system, incoming and outgoing water temperature flow test conduits, air gap separation to prevent backflow self cleaning support conduit, or tank water used both as a geothermal heat exchange medium for heating/cooling of an enclosed structure and as a domestic water supply for the structure as is provided in the present invention.

U.S. Pat. No. 4,237,859 issued to Adam D. Goettl, on Dec. 9, 1980, teaches of a thermal energy storage and utilization system comprising a pair of liquid containing tanks interconnected by a heat exchanger for transferring thermal energy between the tanks so that one tank becomes a cold storage tank and the other becomes a heat storage tank. Various types of thermal energy input and output devices are connected to the liquid containing tanks for selectively supplying and/or utilizing the thermal energy stored therein. Although this system discloses the use of ground water to both heat and cool a residence and supply water to the residence, the invention does not disclose the use of an underground tank which contains heat exchange coils for regulating temperature of a residence. The invention does not provide or teach of an underground tank with heat exchange coils, closed loop heating/cooling system, incoming and outgoing water temperature flow test conduits, air gap separation to prevent backflow self cleaning support conduit, or tank water used both as a geothermal heat exchange medium for heating/cooling of an enclosed structure and as a domestic water supply for the structure as is provided in the present invention.

U.S. Pat. No. 4,375,831, issued to James E. Downing, Jr., on Mar. 8, 1983, discloses a geothermal heating/cooling system which uses an underground water well where a working fluid such as water is pumped in a closed loop from the storage tank through pipe to a heat exchange loop passing through water located in the well and returned to a storage tank at outlet. Although this system uses the geothermal heat capabilities of the well water, it does not pump this water from the well to the storage tank for use as heat exchanger and does not disclose a means for using the water in the storage tank as the water supply for the residence. The invention does not provide or teach of an underground tank with heat exchange coils, closed loop heating/cooling system, incoming and outgoing water temperature flow test conduits, air gap separation to prevent backflow, self cleaning support conduit, or tank water used both as a geothermal heat exchange medium for heating/cooling of an enclosed structure and as a domestic water the supply for structure as is provided in the present invention.

U.S. Pat. No. 4,448,237 issued to William Riley, on May 15, 1984, provides for a method of using ground water in an aqufier as a heat source and heat sink wherein heat is exchanged between the uniform temperature ground water and heat-exchanging apparatus at the earth's surface through a single well bore and the ground water is exchanged between an upper and lower portion of the aqufier in an open system. The invention does not provide or teach of an underground tank with heat exchange coils, closed loop heating/cooling system, incoming and outgoing water temperature flow test conduits, air gap separation to prevent backflow, self cleaning support conduit, or tank water used both as a geothermal heat exchange medium for heating/cooling of an enclosed structure and as a domestic water supply for the structure as is provided in the present invention. U.S. Pat. No. 4,633,676 issued to Edward W. Dittell, on Jan. 6, 1987, provides for an energy transfer apparatus where the apparatus includes a refrigeration system having an evaporator, a compressor, a thermal expansion valve, a main condenser, and a superheated condenser. The well water is provided through conduit into heat exchange relationship with the evaporator and then transported into a first set of cooling coils for cooling air. Storage tanks are utilized for storage of heated absorbable fluid for use as an energy source. The invention is primarily designed for use of city water with a temperature dispensing device to extract heat and then expel the water as wastewater after usage. The invention does not provide or teach of an underground tank with heat exchange coils, closed loop heating/cooling system, incoming and outgoing water temperature flow test conduits, air gap separation to prevent backflow, self cleaning support conduit, or tank water used both as a geothermal heat exchange medium for heating/cooling of an enclosed structure and as a domestic water supply for the structure as is provided in the present invention.

U.S. Pat. No. 4,936,110 issued to Alexander Kuckens, on Jun. 26, 1990, teaches of a structure for and method of heating a space which is exposed to a natural heat influence. The invention provides for a fluid storage buried in the ground, a heat exchanger positioned in the space to be cooled and a means for passing a fluid between the inground fluid storage and heat exchanger in a closed circuit. The invention is primarily a device to extract heat from a greenhouse. The invention does not provide or teach of an underground tank with heat exchange coils, closed loop heating/cooling system, incoming and outgoing water temperature flow test conduits, air gap separation to prevent backflow self cleaning support conduit, or tank water used both as a geothermal heat exchange medium for heating/cooling of an enclosed structure and as a domestic water supply for the structure as is provided in the present invention.

BRIEF DESCRIPTION OF THE DRAWINGS

For a better understanding of the invention reference should be made to the accompanying drawings wherein.

Figure 1:
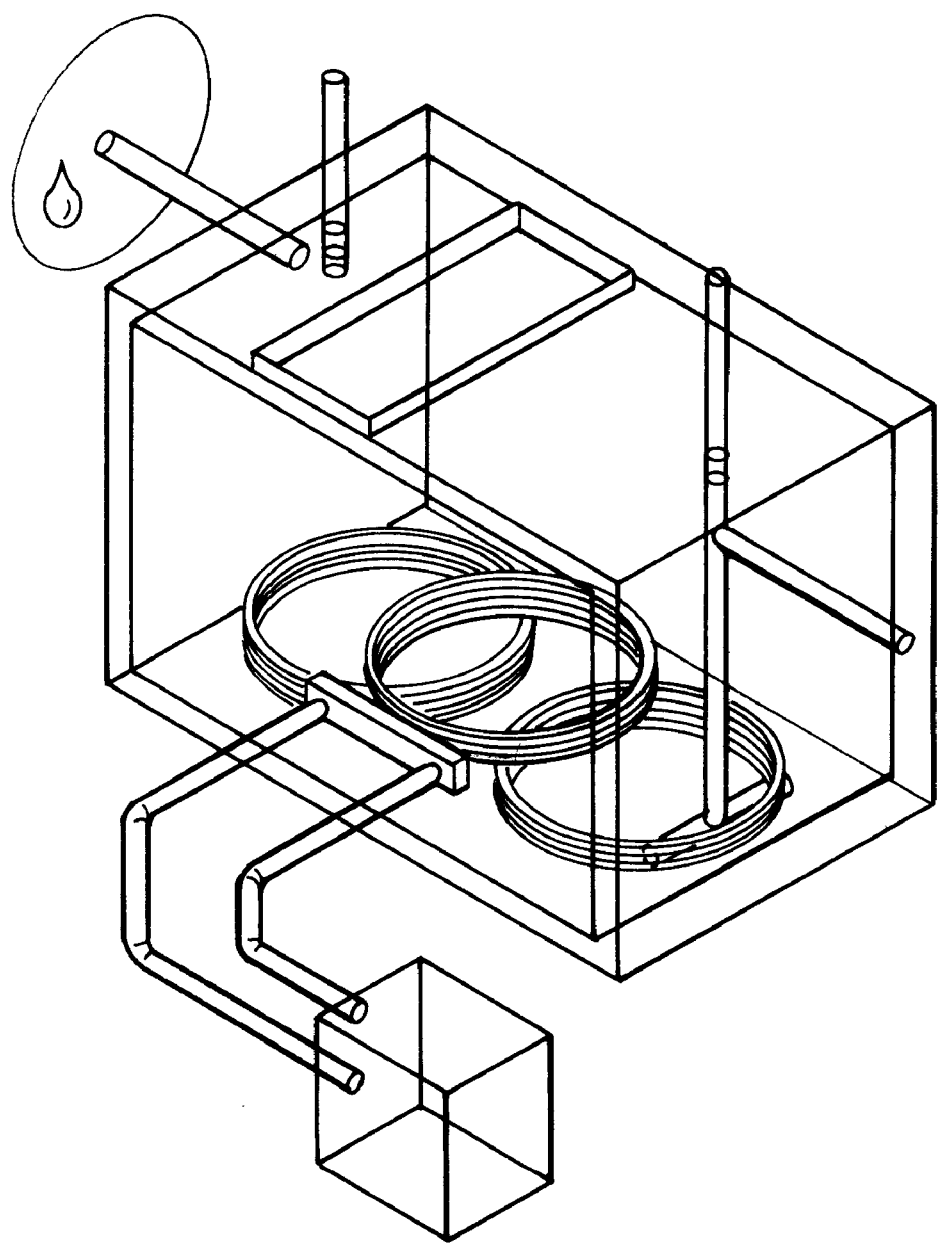
FIG. 1 is a perspective view of the preferred embodiment of the present invention.

LISTING OF THE ELEMENTS 1 is the present invention;
2 is a tank;
3 is a heat exchange coil;
4 is a self cleaning support conduit;
5 is a lid;
6 is an inlet conduit;
7 is an outlet conduit;
8 is a test conduit;
9 is a removable cap;
10 is an air separation gap;
11 is a closed loop conduit;
12 is a water supply source;
13 is a heating/cooling apparatus.

DETAILED DESCRIPTION OF THE DRAWINGS

Reference is now made to the drawings wherein the present invention is illustrated in detail and wherein similar components bear the same reference numeral throughout the several views.

FIG. 1 is a perspective view of the preferred embodiment of the present invention 1 and further illustrates tank 2, heat exchange coil 3, self cleaning support conduit 4, lid 5, inlet conduit 6, outlet conduit 7, test conduit 8, removable cap 9, closed loop conduit 11, water supply source 12, and heating/cooling apparatus 13.

Figure 2:
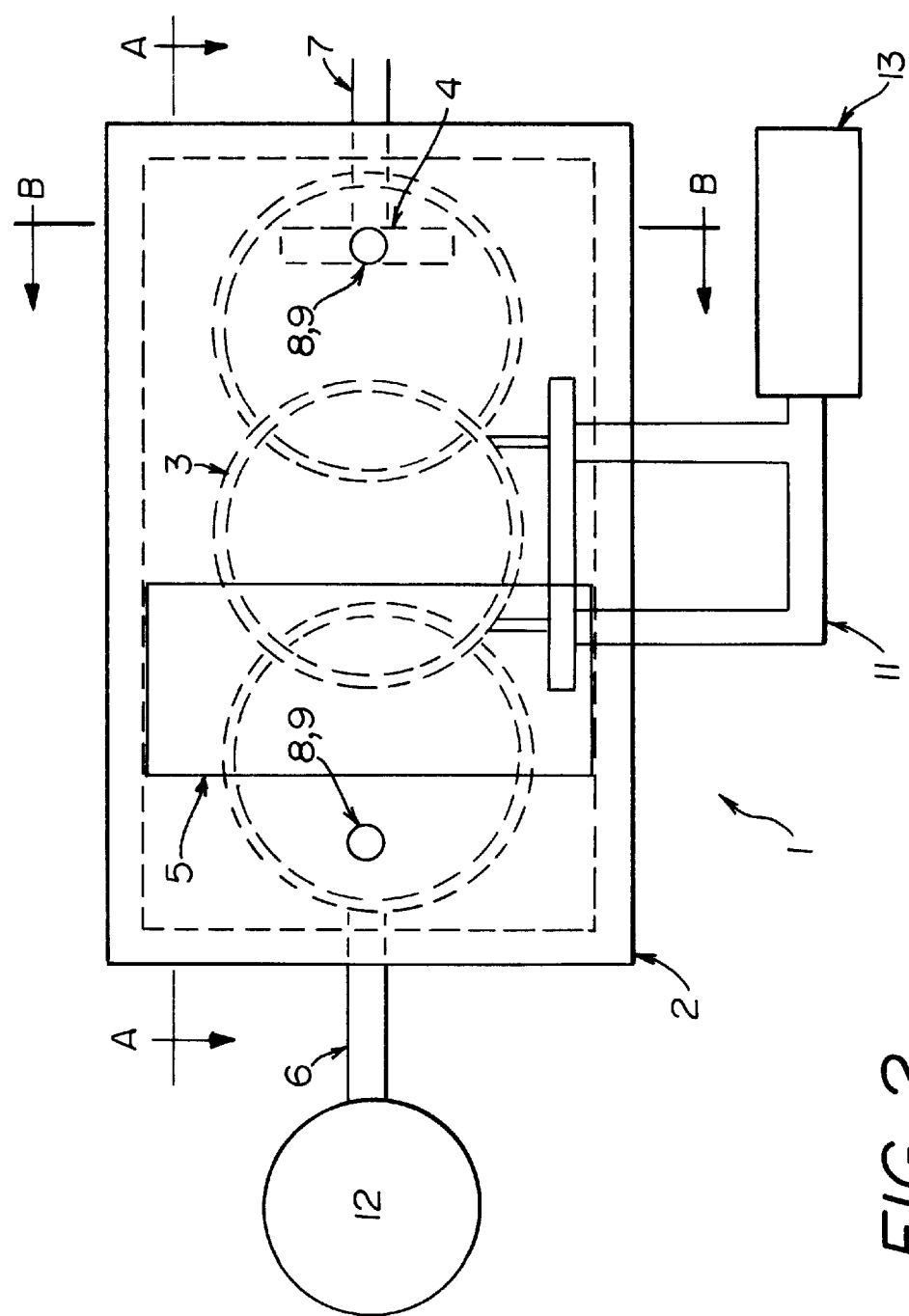
FIG. 2 is a top view of the preferred embodiment of the present invention.

FIG. 2 is a top view of the preferred embodiment of the present invention 1 and further illustrates tank 2, heat exchange coil 3, self cleaning support conduit 4, lid 5, inlet conduit 6, outlet conduit 7, test conduit 8, removable cap 9, air separation cap 10, closed loop conduit 11, water supply source 12, and heating/cooling apparatus 13.

Figure 3:
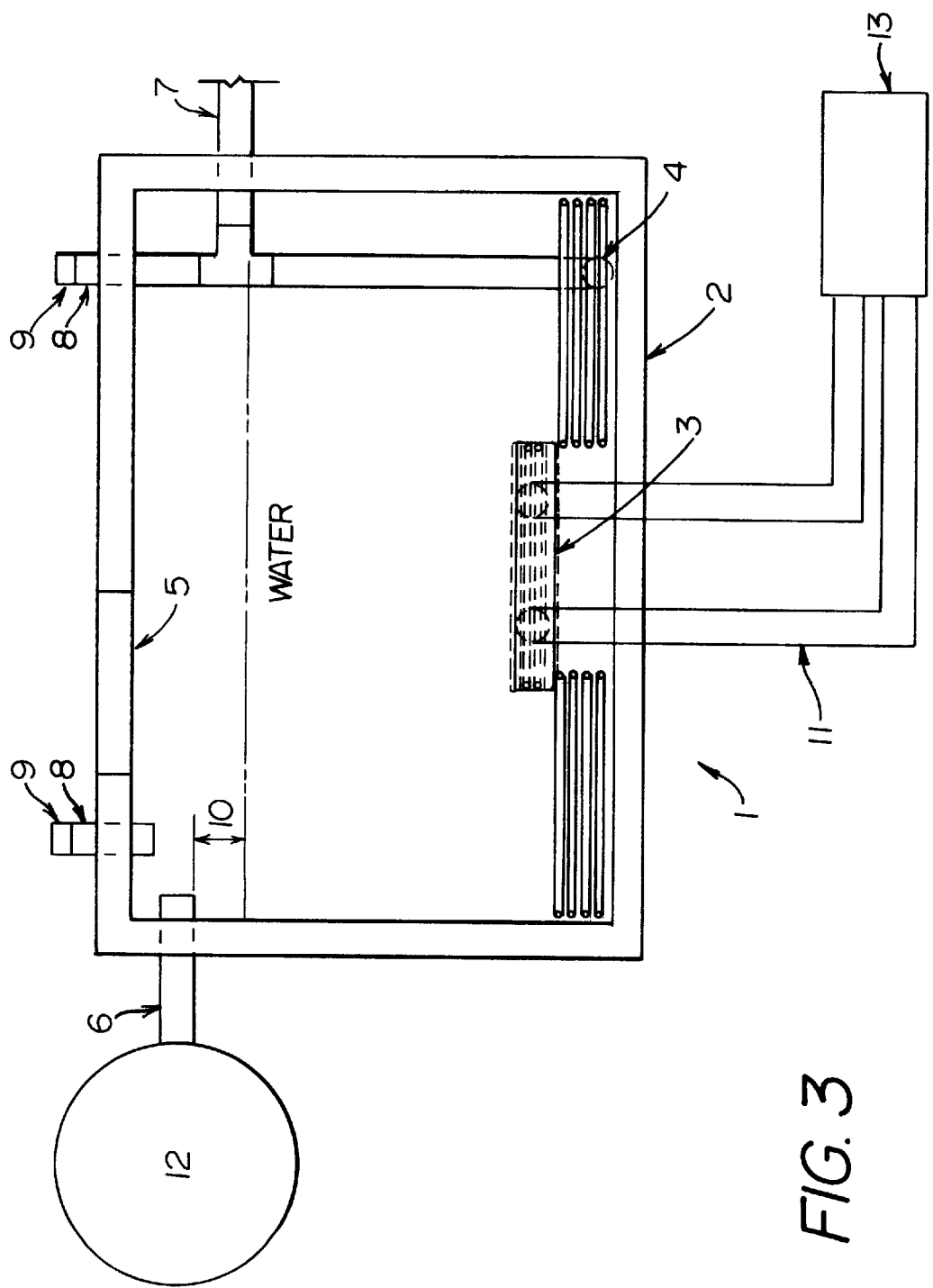
FIG. 3 is a section view of the present invention along Line A—A of FIG. 2.

FIG. 3 is a section view of the present invention along Line A—A of FIG. 2 and further illustrates tank 2, heat exchange coil 3, self cleaning support conduit 4, lid 5, inlet conduit 6, outlet conduit 7, test conduit 8, removable cap 9, air separation cap 10, closed loop conduit 11, water supply source 12, and heating/cooling apparatus 13.

Figure 4:
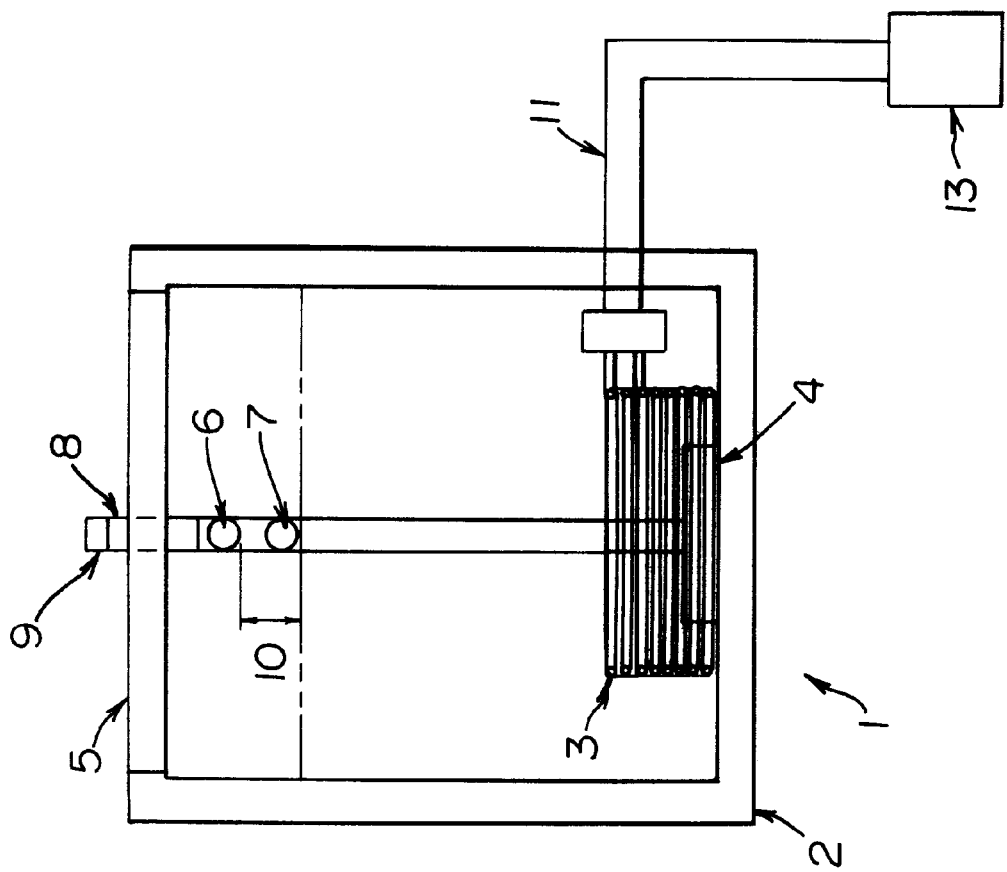
FIG. 4 is a section view of the present invention along Line B—B of FIG. 2.

FIG. 4 is a section view of the present invention along Line B—B of FIG. 2 and further illustrates tank 2, heat exchange coil 3, self cleaning support conduit 4, lid 5, inlet conduit 6, outlet conduit 7, test conduit 8, removable cap 9, air separation cap 10, closed loop conduit 11, and heating/cooling apparatus 13.

DESCRIPTION OF THE PREFERRED EMBODIMENT

Referring to FIGS. 1–5, the preferred embodiment of the present invention comprises a concrete elongated underground sealed tank of approximately 1500 gallon capacity external from an enclosed structure having a removable concrete sealed lid to allow access to the tank for servicing and repairs from the Earth's surface and wherein water enters the tank through an inlet conduit constructed of four (4) inch PVC pipe from a water source preferably a ground well and the water serves as a heat exchange medium interacting with coils of one and one-forth (1¼) inch Geo® pipe disposed within the tank from a closed loop geothermal heating/cooling system to provide heating/cooling to an enclosed structure and wherein the water in the tank is also removed from the tank through an outlet conduit of four (4) inch PVC pipe to the structure and may be employed as a domestic water source for the structure. Incoming and outgoing water temperature and flow can be tested through test conduits of four (4) inch PVC pipe provided through the top of the tank to and above the Earth's surface. Removable caps are further provided to seal the test conduits. A support conduit of four (4) inch PVC pipe is provided and connects and communicates with the outlet conduit and one capped test conduit within the tank to eliminate sediment build up within the tank and around the loops of the coil and further guarantees the mix of incoming and outgoing water temperature and provides accessibility to measure internal flow and temperature difference between the incoming and outgoing water within the tank. An air gap of four (4) inches minimum is further provided within the tank between the inlet conduit and outlet conduit to prevent backflow of the water within the tank to the water source should any unforeseen contamination enter the tank.

Although the invention has been described in preferred form with a certain degree of particularity, it is understood that the present disclosure of the preferred form has been made only by way of example and numerous changes in the details of construction and the combination arrangement of the parts may be resorted to without departing from the spirit and scope of the invention as hereinafter claimed.

What is claimed is:

1. A geothermal heat exchanger in a heating and cooling system for conditioning the air in an enclosed structure wherein a working fluid is circulated in a closed loop from said geothermal heat exchanger to a heating and cooling means disposed within said structure to selectively heat or cool said enclosed structure comprising:

An elongated sealed tank with two ends, top, and bottom and external to said enclosed structure and buried in the Earth, said tank having and inlet conduit disposed at one end and slightly below said top of said tank and connecting and communicating with an external water source and the interior of said tank and an outlet conduit disposed at the opposite end of said tank and at a depth below said inlet conduit and connecting and communicating with said enclosed structure and the interior of said tank so that water enters said tank from said external water source through said inlet conduit, travels downwardly fills said tank to the level of said outlet conduit and engages in a heat exchange relationship with coils disposed within said tank and exits said tank through said outlet conduit to said enclosed structure providing a domestic water supply for said enclosed structure, said tank having an air gap within said tank between said inlet conduit and said outlet conduit preventing back flow of water to said external water source, said tank having a removable sealed lid at said top to allow access to said tank from the surface of the Earth, said tank having a test conduit with a removable cap disposed through said top of said tank near said inlet conduit extending vertically to and above the surface of the earth and communicating with the interior of said tank to provide for waterflow testing and temperature testing of incoming water in said tank, said tank having a second test conduit disposed through said top of said tank near said outlet conduit extending vertically to and above the surface of the Earth and communicating with the interior of said tank and said outlet conduit to provide water flow testing and temperature testing of outgoing water in said tank, and said tank having a support conduit disposed at said bottom of said tank and extending vertically and connecting and communicating with said second test conduit and said outlet conduit to eliminate and provide for the removal of sediment in said tank;

an inlet conduit disposed at one end and slightly below said top of said tank and communicating with said external water source and the interior of said tank;

an external water source connecting and communicating with said inlet conduit and the interior of said tank;

an outlet conduit disposed at the opposite end of said tank and at a depth below said inlet conduit and connecting and communicating with said enclosed structure and the interior of said tank providing a domestic water supply for said enclosed structure;

coils disposed within said tank engaging in a heat exchange relationship between fluid flowing through said coils and the water in said tank and connecting and communicating through conduit in a closed loop with said heating and cooling means disposed within said enclosed structure to condition the air in said enclosed structure;

conduit connecting and communicating with said coils and said heating and cooling means in a closed loop;

heating and cooling means disposed within said enclosed structure to condition the air in said enclosed structure and connecting and communicating with said coils and said conduit in a closed loop;

fluid flowing through said conduit, said heating and cooling means, and said coils and engaging in a heat exchange relationship with the water in said tank;

an air gap within said tank disposed between said inlet conduit and said outlet conduit to prevent backflow to said external water source;

a removable sealed lid disposed on said top of said tank to provide access to said tank from the Earth's surface;

a test conduit with said removable cap disposed through said top of said tank near said inlet conduit extending vertically to and above the surface of the Earth and communicating with the interior of said tank to provide for waterflow testing and temperature testing of incoming water in said tank;

a second test conduit with said removable cap disposed through said top of said tank near said outlet conduit extending vertically to and above the surface of the Earth and communicating with the interior of said tank and said outlet conduit to provide water flow testing and temperature testing of outgoing water in said tank;

a removable cap disposed at the Earth's surface end of said first and said second test conduit to seal said first and said second test conduit.

a support conduit disposed at said bottom of said tank and extending vertically and connecting and communicating with said second test conduit and said outlet conduit to eliminate and provide for the removal of sediment in said tank.

2. The invention of claim 1 wherein the water supply source is an artesian well.

3. The invention of claim 1 wherein the water supply source is wastewater.

4. The invention of claim 1 wherein the water supply source is surplus water.

5. The invention of claim 1 wherein the water supply source is overflow water.

6. The invention of claim 1 wherein the water supply source is a public works.

7. The invention of claim 1 wherein the conduit fluid is water.

8. The invention of claim 1 wherein the conduit fluid is a nontoxic antifreeze solution.

* * * * *